Patented Oct. 27, 1953

2,657,154

UNITED STATES PATENT OFFICE 2,657,154

PROCESS OF ACIDPROOFING THE SURFACE OF POROUS CALCAREOUS ARTICLES

Cornelis Brouwer, Beverwijk, Netherlands

No Drawing. Application May 15, 1951, Serial No. 226,536. In the Netherlands May 16, 1950

8 Claims. (Cl. 117—54)

The invention concerns a process for acid-proofing surfaces of articles constructed of cement, lime and/or similar binding media, especially concrete articles.

In the sense of this patent application the expression "article" must be interpreted very generally, so that it embraces reinforced concrete floors and large concrete structures in general.

Products produced with the binding media above-mentioned contain ingredients such as free lime, aluminium oxide and iron oxide which render the products but little resistant to chemical influences and particularly reduce resistance to acids.

It is known to obviate this disadvantage by treating the surfaces with solutions of certain salts, which react with the constituents of the concrete articles.

For other reasons also, the surfaces of said articles are treated with solutions of salts, namely to seal up the surface. In this case, the object is to bring about depositions by a chemical reaction in the pores of the surface, which are thereby sealed. An example of a treatment of the first mentioned kind is the acid-proofing treatment wherein articles are treated with a solution of a metallic silicon fluoride ($MgSiF_6$). Magnesium silicon fluoride can be used as the metallic silicon fluoride, while other similar substances could be used. The magnesium silicon fluoride will react with the free lime present as follows:

$$2Ca(OH)_2 + MgSiF_6 \rightarrow 2CaF_2 + MgF_2 + SiO_2 + 2H_2O$$

As is evident from the reaction equation, calcium fluoride and magnesium fluoride are produced, which are relatively resistant materials. Silicon di-oxide is also formed which is practically quite insoluble in hydrochloric acid.

Besides the magnesium fluoride, the silicon dioxide also fills the pores of the article to be treated. The silicon oxide can however combine with a large quantity of water, whereby meta-silicic acid ($SiO_2.H_2O$), ortho-silicic acid ($SiO_2.2H_2O$) and poly-silicic acid $$(SiO_2.XH_2O)$$

are formed. These silicic acids are very voluminous, so that even with the first treatment of the article the pores are "caulked." The articles can then with difficulty undergo a second treatment.

By the treatment described both a sealed outer surface and also an acid-resisting outer surface are obtained simultaneously, or at least a surface which is resistant against chemical influences.

With these known processes, the treating means is always used in a liquid form or dissolved in liquid. Therefore only a thin outer layer of the surface is treated, as the solutions used have difficulty in penetrating into the material. A reduction in the viscosity of the liquid treating medium does not lead to a better result, particularly not if the viscosity is reduced by decreasing the content of the treating medium proper, e. g. the metallic silicon fluoride. The difficulty of insufficient penetration becomes greater if the pores of the article to be treated are small.

Gaseous silicon compounds have been used previously which decompose with water into silicic acid and a compound which reacts with constituents of the binding medium to form soluble compounds. An example of such a material is silicon tetrafluoride. With this known method measures are first taken in order to moisten the surface to be treated.

It is attempted to obtain a chemical conversion in consequence of which the pores are sealed. So far there is an analogy with those processes in which solutions are used.

The present invention resides in the discovery that considerably better results are obtained, when dry articles are treated with gases or vapour. In order to get a thick treated layer, the presence of moisture must be prevented. In that case one prevents sealing of the pores which would hinder the penetration of the gas or the vapour, so that the reaction could not take place deeper in the pores. Therefore according to the invention the gas or vapour treatment is applied to dry, not moistened articles.

The invention is hereinafter more particularly described. The dry surfaces of the said articles are for example advantageously treated with silicon tetra-fluoride in gaseous form, or with a gas containing silicon tetra-fluoride. The following reaction thereupon takes place:

$$2Ca(OH)_2 + SiF_4 \rightarrow 2CaF_2 + SiO_2 + 2H_2O$$

Only ortho-silicic acid is formed therewith. The pores of the article to be treated are then not immediately filled, so that the gaseous silicon tetra-fluoride or the gas containing silicon tetra-tetra-fluoride can readily enter the pores of the article to be treated. The acid resistivity of the article treated is not restricted to the surface thereof but extends into the interior of the article and deeper than when an aqueous solution is used.

The invention can naturally be performed with other materials, depending on the kind of conversions desired. If one works with hydrofluoric acid, then this will attack the silicon dioxide in the surface, with the formation of $SiF_4$, which is inconvenient, while a compound insoluble in acids is not formed in the pores. If calcium hydroxide still unconverted is present in the surface, this forms silicon dioxide with $SiF_4$. In this way, however, a smaller increase in acid resistance is obtained, than when starting with silicon tetra-fluoride. If one applies a gaseous mixture of hydro-fluoric acid and silicon tetra-fluoride, however, then a substantially better result is obtained.

With the process according to the invention, it is possible to allow the silicon tetra-fluoride or the gas containing silicon tetra-fluoride to penetrate more or less into the article to be treated. This is dependent upon the pressure of the gas, the time during which the article to be treated is under the influence of the gas, and the moisture content of the article to be treated. From the point of view of economy it is desirable that the gas should penetrate about 2 to 4 mm. into the article to be treated.

It is advisable to apply the gas to the article to be treated under pressure, but it is also possible to use vacuum for the penetration of the gas or gas mixture.

The process according to the invention is further illustrated by the following example.

Example 1

A tile of limestone concrete with a thickness of about 15 mm. is during 15 minutes subjected to gaseous silicon tetra-fluoride under a pressure of about 3 atmospheres. Good resistance to acid is produced, which can be noted by testing the treated tile with hydrochloric acid of about 15% concentration and washing off after neutralization. This treatment is repeated fifteen times. At the same time the articles treated show less wear.

Example 2

A piece of concrete is laid in a small gas tank after which gaseous silicon tetra-fluoride is introduced into the tank at a pressure of about 4 atmospheres. The concrete remains several hours in the tank. After treatment the concrete shows good acid resistance and greater resistance to deterioration. The resistance to acids can be observed by laying a piece of treated concrete and an untreated piece in 15% hydrochloric acid for an hour. The difference is clearly noticeable.

It is preferred to treat the articles to be treated not only in a dry condition with the gases or vapours, but to subject the articles to an extra drying. Therefore according to a preferred embodiment according to the invention not only so-called air-dry articles are treated, but a further extra pre-drying is applied. Owing to this the normal fixed moisture in consequence of the degree of moisture of the surrounding air, and also moisture which may still be present in the articles, is removed so that the gases or vapours penetrate considerably deeper in the articles of concrete, artificial granite and such materials, when said articles are strongly pre-dried. This effect is of such an importance, that it makes remunerative the pre-drying of generally very voluminous and heavy articles.

In practice it appears, that by a gas treatment the gas can penetrate in the special pre-dried articles to e. g. 4 cm. and in this manner a very thick acid resistant layer can be formed.

For example the articles can be dried in a tunnel, through which hot air of e. g. ±40° C. is led. Dependent on the nature of the articles to be dried the drying shall have to continue a longer or shorter time. In practice very good results are obtained after a drying of 3-4 days.

Also the gas treatment can be preceded by drying a shorter or longer time dependent on the nature of the articles to be treated. Already after 4 hours in all respects usuable results are obtained, which are especially good after about 24 hours.

The special effect of the process according to the invention can perhaps be shown by the fact, that during the drying moisture evaporates, which vapor escapes and keeps the pores open.

When drying, one has—especially as per the quickness of drying and the height of the temperature—to take into account the moisture degree of the articles, in order to prevent bursting and cracking.

Also other ways of drying than with the aid of hot air can be applied. So the articles could be placed in evacuated rooms and/or rooms, in which hygroscopic substances have been provided.

I claim:

1. A process of acid proofing the surfaces of porous calcareous articles of concrete and the like subject to attack by acids and containing calcium compounds capable of reacting with silicon tetrafluoride which comprises contacting the dry surface of such an article with gaseous silicon tetrafluoride for a time sufficient to cause the silicon tetrafluoride to penetrate and react within the pores thereof, the said dry surface being previously dried at least to the air-dry state.

2. The process of claim 1, wherein the surface to be treated is subjected to a separate drying operation by exposure to air heated to a temperature of the order of 40° C. and for a length of time sufficient to complete the drying operation.

3. The process of claim 1, wherein the gaseous silicon tetrafluoride is contacted with the surface to be acid proofed while under a superatmospheric pressure of from about 3 to about 4 atmospheres.

4. The process of claim 1, wherein the surface to be acid proofed is subjected to the silicon tetrafluoride for a period ranging from about 15 minutes to several hours.

5. The process of claim 1, wherein the surface to be acid proofed is predried at a temperature of about 40° C. for a period of from about 3 to 4 days and then subjected to the silicon tetrafluoride until this gas has penetrated to a depth of up to about 4 cm.

6. The process of acid proofing concrete containing calcium compounds capable of reacting with silicon tetrafluoride which comprises drying the concrete to be acid proofed until its surface has at least reached the air dry state then subjecting the dry surface to the action of dry silicon tetrafluoride for a period of from about 15 minutes to several hours.

7. The process of claim 6, wherein the concrete is dried by heating it to a temperature of the order of 40° C. for a period of from about 4 hours to 4 days.

8. In the acid proofing of the surfaces of porous calcareous articles of concrete and the like subject to attack by acids and containing calcium compounds reactive with silicon tetrafluoride, the process which comprises heating and drying the surface of the article to be treated for a time sufficient to produce a state of dryness at least equivalent to that produced by heating the article to a temperature of about 40° C. for a period of from about 4 hours to 4 days, then exposing the resulting dry surface to the action of gaseous silicon tetrafluoride for a period ranging from about 15 minutes to several hours sufficient to cause penetration of the reacted layer to a depth of from about 2 to 4 mm.

CORNELIS BROUWER.

References Cited in the file of this patent

FOREIGN PATENTS

| Number | Country | Date |
|--------|---------|------|
| 260,031 | Great Britain | Oct. 18, 1926 |